May 2, 1933. C. W. SPICER ET AL 1,907,127
CASING FOR UNIVERSAL JOINTS
Filed Dec. 3, 1930
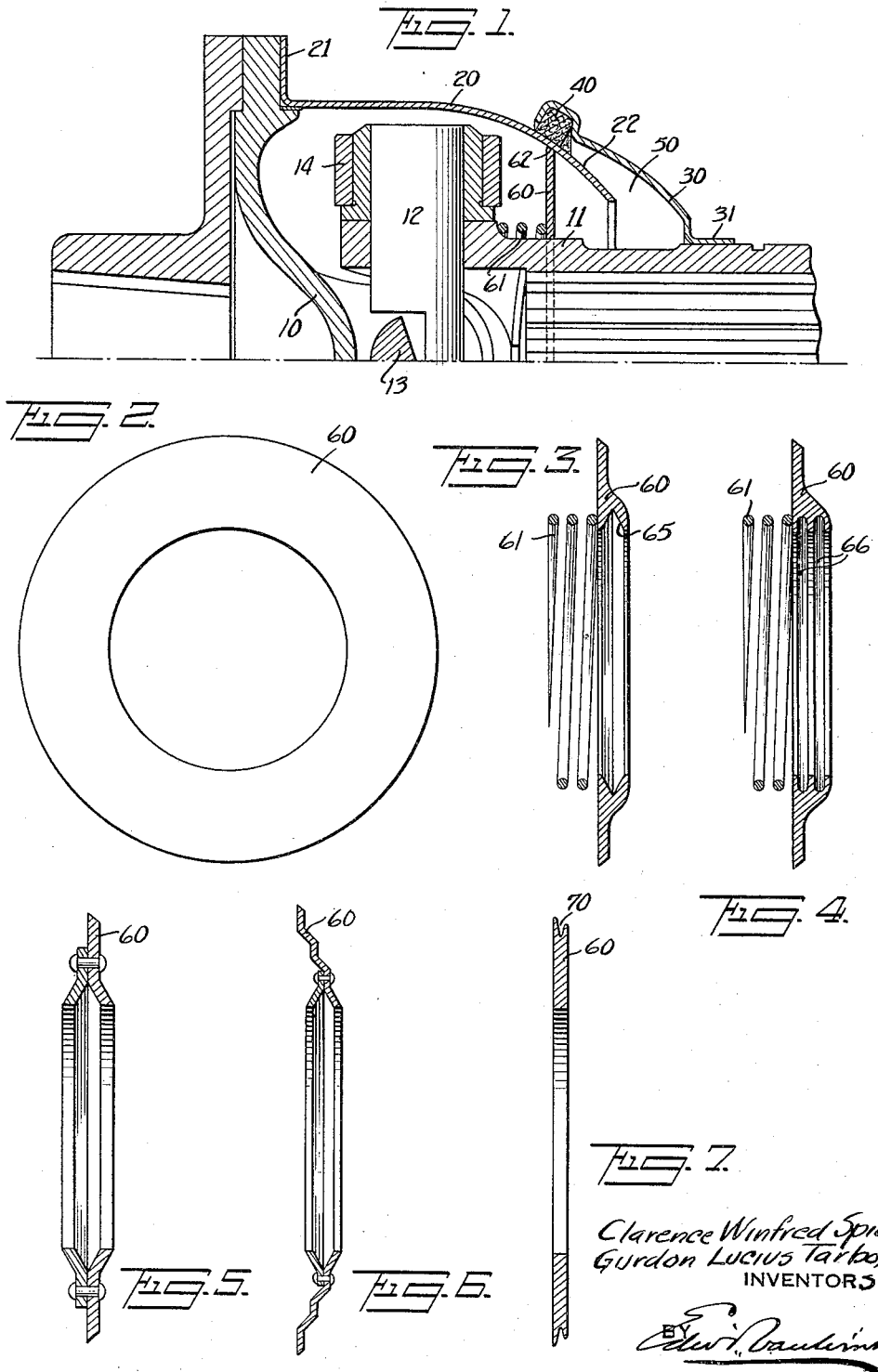
Clarence Winfred Spicer
Gurdon Lucius Tarbox
INVENTORS
THEIR ATTORNEY Patented May 2, 1933

1,907,127

UNITED STATES PATENT OFFICE

CLARENCE WINFRED SPICER AND GURDON LUCIUS TARBOX, OF TOLEDO, OHIO

CASING FOR UNIVERSAL JOINTS

Application filed December 3, 1930. Serial No. 499,650.

Our invention relates to casings for universal joints, especially to the rigid encased type and has for its object to produce a casing that will prevent the loss of lubricant by throwing, due to centrifugal force. There are a great many different kinds of casings for universal joints now on the market. They may, however be described as sliding joint casings with the two cups connected for sliding movement and packed for the purpose of preventing the escape of lubricant. Generally the packing is of cork or similar material. The shape of the cups and the formation of the cork packing varies in many forms. Great claims have been made for all of these casings but in actual practice they have not been able to hold the lubricant because the contact material will "wipe" over the lubricant instead of cutting through it.

We have found out that with this form of packing the joint between the two casings is ineffective and that lubricant works out and the casing runs dry. From our many experiments we have found out that unless the contact area between the casings is such that the unit pressure is high enough to penetrate the viscous fluid of the lubricant and thereby provide a seal and successful scraping action, the casing will throw lubricant.

The object of the present invention is to provide a casing that will overcome the difficulties theretofore experienced in a simple and economical way.

The foregoing and other features of our invention will now be described in connection with the accompanying drawing forming part of this disclosure in which we have represented our casing in its preferred form after which we shall point out more particularly in the claims those features which we believe to be new and of our joint invention.

In the drawing accompanying and forming part of this specification:

Figure 1 is a longitudinal section of a typical incased universal joint with our invention installed therein.

Figure 2 is a view of the baffle which we employ at right angles to the section, Figure 1.

Figures 3, 4, 5, 6 and 7 are typical sections of the baffle at right angles to the view shown in Figure 2.

In Figure 1 we have illustrated a common form of universal joint comprising a driving member 10, a driven member 11, connected together for universal movement through the cross pins 12 and 13 and torque ring 14. Joints of this character are normally encased in two part casing, the form shown being typical in which the inner casing 20 is provided with a flange 21 for convenience in attaching it to the driving member 10. The outer casing 30 is provided with a sleeve 31 for mounting on the driven member 11. The outer casing is provided with a packing 40 which rides on the partially spherical outside surface 22 of the inside casing 20 and is supposed to retain the lubricant within the casing.

The description so far is common to encased universal joints which fall in the class of those to which our invention will be attached to overcome the lubricant throwing tendencies inherent to that type of joint.

With that construction any lubricant working into the space 50 between the inner and outer casing will be forced under the packing 40 by the action of centrifugal force as will be readily understood.

In carrying out our invention we provide a substantially disc shape member 60 of such material and thickness that when pressed against the inside of the partly spherical surface of the casing 20 by the spring 61 the unit pressure between the edge 62 of the disc or baffle 60 and the casing 20 is great enough to substantially penetrate the lubricant within the casing and thereby provide a seal and successful scraping action whereby the lubricant will be scraped off the inside of the casing 20 and retained therein.

In Figure 1 we have shown a flat disc for our baffle. We do not wish to limit ourselves to this flat shape. We may even use a disc as shown in Figures 3 and 4 moulded of semiflexible material, having a packing ring 65 which will closely fit against the driven member 11 or the disc may be provided with a labyrinth grease seal 66 as shown in section in Figure 4. Figure 7 shows a disc 60 with a labyrinth of grease seal 70 at its outer edge or rim.

We may even stamp the disc 60 as shown in Figures 5 and 6, the main feature being that the baffle 60 is substantially disc-shaped and provided with a ring which contacts with the partially spherical inner surface of casing 20 that is substantially rigid in the direction of its axis and flexible enough to conform with the irregularities of the casing 20, at the same time exerting a unit pressure that will penetrate the lubricant and thereby provide a seal and successful scraping action.

We wish it distinctly understood that our encased universal joint herein described and illustrated is in the form in which we desire to construct it but that changes or variations may be made as may be convenient or desirable without departing from the salient features of our invention and we therefore intend the following claims to cover such modifications as naturally fall within the lines of invention.

We claim:

1. A casing for a universal joint comprising a casing which is partially spherical, a disc-shaped baffle made of a single piece of material that will support, and is provided at its outer periphery with, a cutting edge, the outer edge of which is held in pressure contact with the inside surface of the partially spherical casing.

2. A casing for a universal joint comprising a casing which is partially spherical containing lubricant, a baffle made of a single piece of material that will support, and is provided at its outer periphery with, a cutting edge provided with a circular outer edge which makes pressure contact with the inside surface of the partially spherical casing.

3. The device of claim 2 in which the contact area is spring loaded so that the unit pressure between the outer edge of the baffle and the casing is great enough to substantially penetrate the lubricant and thereby provide a seal and successful scraping action.

4. A casing for a universal joint comprising a two part casing one of which is partly spherical, the inner casing being substantially disc shape made of a single piece of material that will support, and is provided at its outer periphery with, a cutting edge, the outer edge adapted to ride on the inside surface of the partly spherical surface of the casing.

5. A casing for a universal joint comprising a plurality of cups mounted for universal movement on shaft members, a baffle comprising a substantially disc-shape plate made of a single piece of material that will support, and is provided at its outer periphery with, a cutting edge provided with an outer edge adapted to ride against the inside surface of the innermost cup, the baffle rim being substantially rigid in the direction of its axis and flexible enough to conform with the irregularities of the shape of the innermost cup, at the same time exerting a spring pressure thereby making the cutting action of the edge more effective.

6. A casing for universal joint comprising a plurality of members one of which is partly spherical, the outer edge of one of the members provided with a cutting edge, and contacting only with the adjacent partially spherical member and having distinct clearance between it and the partly spherical member on either side of said edge.

7. A casing for universal joint comprising a plurality of shields one of which is partly spherical and containing lubricant, one of the shields made of a single piece of material that will support, and is provided at its outer periphery with, a cutting edge contacting only with its outer rim with the adjacent partially spherical shield and with such unit pressure that said rim cuts substantially through the lubricant contained in the casing; there being distinct clearance between the two shields either side of said rim.

8. A casing for a universal joint comprising a two part casing one of which is partly spherical, the inner casing being substantially disc shape made of a single piece of material that will support a cutting edge, the outer edge provided with a plurality of cutting edges which makes pressure contact with the inside surface of the partly spherical surface of the outer casing.

9. The device of claim 1, the outer edge of the baffle being formed with a plurality of cutting edges with annular space there-between forming a liquid seal between the disc shaped member and the inside of the partly spherical casing.

10. The device of claim 1 the contact area being divided into a plurality of cutting edges and grooves, said grooves forming means for providing for a liquid seal between the baffle and the casing.

11. A casing for universal joint comprising a cup which is partially spherical containing lubricant, a baffle with a circular outer rim, said outer rim provided with a plurality of cutting edges which make pressure contact with the inside surface of the partially spherical cup.

12. A casing for universal joint comprising a cup which is partly spherical containing lubricant, a baffle with a circular outer rim, said outer rim made of a single piece of material that will support, and is provided at its outer periphery with a cutting edge, said edge held in pressure contact with the inside surface of the partially spherical casing.

In testimony whereof we have affixed our signatures.

CLARENCE WINFRED SPICER.
GURDON LUCIUS TARBOX.